United States Patent
Stolz et al.

(10) Patent No.: US 11,648,851 B2
(45) Date of Patent: May 16, 2023

(54) ON-BOARD ELECTRICAL SYSTEM AND METHOD FOR OPERATING AN ON-BOARD NETWORK

(71) Applicant: VOLKSWAGEN AKTIENGESELLSCHAFT, Wolfsburg (DE)

(72) Inventors: Markus Stolz, Rühen (DE); Rainer Fleischer, Wolfsburg (DE)

(73) Assignee: Volkswagen Aktiengesellschaft

( * ) Notice: Subject to any disclaimer, the term of this patent is extended or adjusted under 35 U.S.C. 154(b) by 170 days.

(21) Appl. No.: 17/066,780

(22) Filed: Oct. 9, 2020

(65) Prior Publication Data

US 2021/0107376 A1 Apr. 15, 2021

(30) Foreign Application Priority Data

Oct. 10, 2019 (DE) .................. 10 2019 215 517.0

(51) Int. Cl.
*B60L 58/18* (2019.01)
*B60R 16/033* (2006.01)

(52) U.S. Cl.
CPC ............ *B60L 58/18* (2019.02); *B60R 16/033* (2013.01); *B60L 2210/10* (2013.01)

(58) Field of Classification Search
CPC ..... B60L 58/18; B60L 2210/10; B60R 16/033
USPC ........................................................ 318/139
See application file for complete search history.

(56) References Cited

U.S. PATENT DOCUMENTS

| | | | |
|---|---|---|---|
| 10,741,885 B2 | 8/2020 | Zacher et al. | |
| 11,104,232 B2 | 8/2021 | Mittnacht et al. | |
| 2012/0126733 A1* | 5/2012 | El-Refaie | H02M 7/537 |
| | | | 318/400.26 |
| 2020/0324719 A1* | 10/2020 | Mahmoud | H02J 9/061 |

FOREIGN PATENT DOCUMENTS

| | | | | |
|---|---|---|---|---|
| DE | 102013015516 A1 | 7/2014 | | |
| DE | 102013015713 A1 | 3/2015 | | |
| DE | 102017114339 A1 | 1/2019 | | |
| DE | 102017123458 A1 | 4/2019 | | |
| EP | 3046198 A1 * | 7/2016 | ............. B60L 1/003 |
| EP | 3046198 A1 | 7/2016 | | |

* cited by examiner

*Primary Examiner* — Kawing Chan
(74) *Attorney, Agent, or Firm* — Barnes & Thornburg, LLP

(57) ABSTRACT

An electrical on-board power system for an electrically driven transportation vehicle having a traction battery with a first battery terminal and a second battery terminal, a first current path between the first battery terminal and a first terminal, and a second current path between the second battery terminal and a second terminal. An electrical or electromagnetic first switch is connected in the first current path and an electrical or electromagnetic second switch is connected in the second current path. The on-board power system has a DC-to-DC voltage converter connected at output to a low-voltage system, wherein a first input of the DC-to-DC voltage converter is connected to a first tap in the first current path and the first switch, and a second input of the DC-to-DC voltage converter is connected to a second tap between the second switch and the second load terminal.

11 Claims, 2 Drawing Sheets

ON-BOARD ELECTRICAL SYSTEM AND METHOD FOR OPERATING AN ON-BOARD NETWORK

PRIORITY CLAIM

This patent application claims priority to German Patent Application No. 10 2019 215 517.0, filed 10 Oct. 2019, the disclosure of which is incorporated herein by reference in its entirety.

SUMMARY

Illustrative embodiments relate to an electrical on-board power system for an electrically driven transportation vehicle, having a traction battery and having a DC-to-DC voltage converter. The illustrative embodiments furthermore relate to a method for operating such an on-board power system and to an electrically driven transportation vehicle having same.

BRIEF DESCRIPTION OF THE DRAWINGS

Exemplary embodiments are explained in more detail below with reference to the drawings. In the drawings.

DETAILED DESCRIPTION

Figure 1:
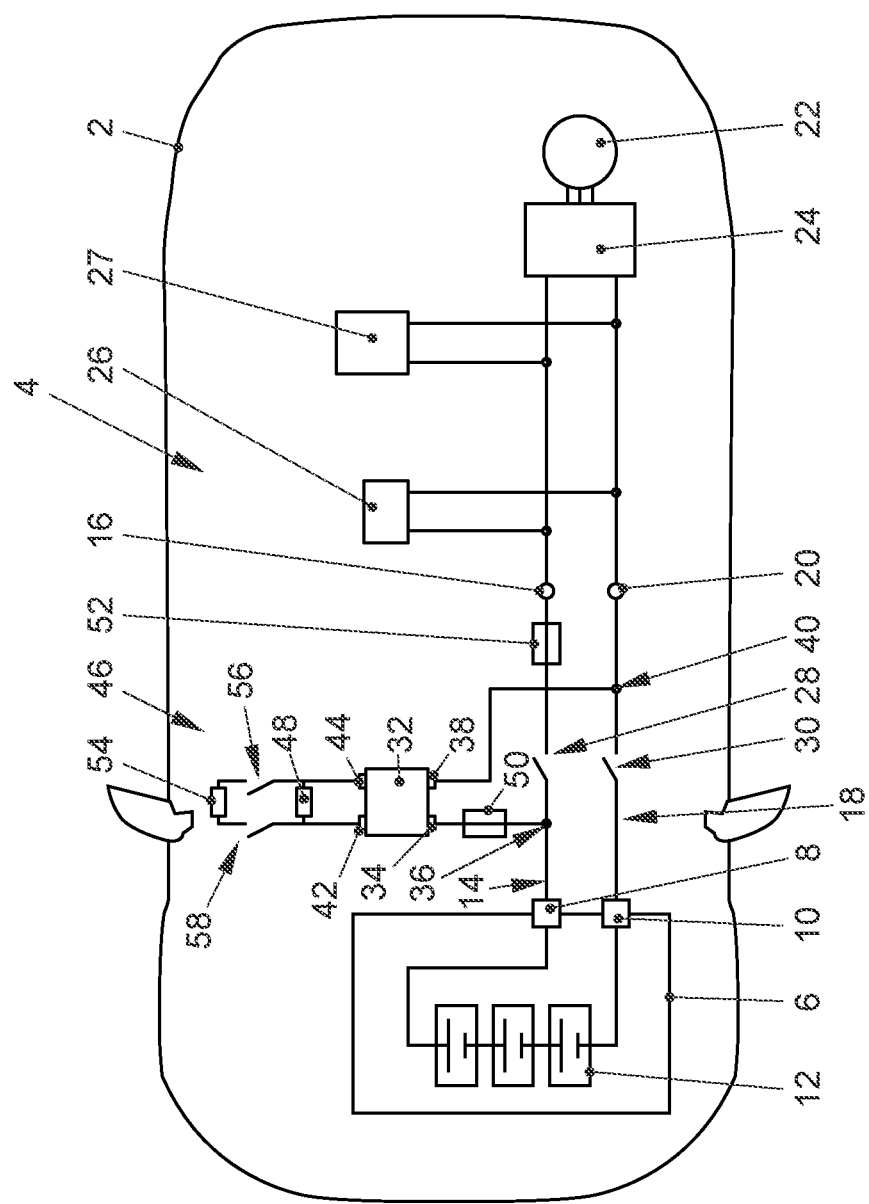
FIG. 1 schematically shows a plan view of an electrically driven transportation vehicle having an electrical on-board power system, which has a traction battery and a DC-to-DC voltage converter, by which a low-voltage system is supplied redundantly with energy by the traction battery.

An electrically driven transportation vehicle typically has an electrical on-board power system having a traction battery (high voltage, HV battery). In this case, an electrically driven transportation vehicle is understood to mean, in particular, an electric transportation vehicle that stores the energy required for drive purposes only in the traction battery (BEV, battery electric transportation vehicle), an electric transportation vehicle having a range extender (REEV, range extended electric transportation vehicle), a hybrid transportation vehicle (HEV, hybrid electric transportation vehicle), a plug-in hybrid transportation vehicle (PHEV, plug-in hybrid electric transportation vehicle) and/or a fuel cell transportation vehicle (FCEV, fuel cell electric transportation vehicle) that buffer-stores the electrical energy generated by way of a fuel cell in the traction battery.

The traction battery in this case provides a high voltage, that is to say a voltage having a value greater than 60 V. A high-voltage consumer, such as, for example, an electric motor for driving the transportation vehicle, is thus able to be supplied with energy by way of the traction battery.

By way of example, the on-board power system additionally has a subsystem, called low-voltage system, having a voltage of up to 60 V, wherein one or more safety-relevant low-voltage consumers is or are connected in the subsystem. A "safety-relevant consumer" is in this case understood to mean a consumer that performs a function for ensuring the safety, in particular, the integrity, of the transportation vehicle, the occupants and/or other traffic participants. Such safety-relevant consumers are assigned to a risk class, for example, in accordance with ISO 26262 (more generally IEC 61508). By way of example, safety-relevant low-voltage consumers of the transportation vehicle are a light, a brake system, a steering system, a roll stabilization system or an airbag. Safety-relevant consumers should be delimited from a comfort consumer that performs one or more comfort functions. By way of example, a seat adjuster or an audio system is a comfort consumer. For safety-relevant consumers, there is often the need, for example, from the standards, for a redundant energy supply. Such a redundant energy supply for the safety-relevant low-voltage consumers is relevant for autonomous or partly autonomous operation of the transportation vehicle.

Disclosed embodiments provide a suitable on-board power system. A redundant energy supply for a safety-relevant low-voltage consumer should in this case be achieved reliably and/or in a manner using as few components as possible. The intention is also to specify a method for operating such an on-board power system and an electrically driven transportation vehicle having such an on-board power system.

Disclosed embodiments provide an electrical on-board power system, a method, and an electrically driven transportation vehicle. In this case, the explanations in connection with the electrical on-board power system also apply analogously to the method and to the electrically driven transportation vehicle, and vice versa.

The electrical on-board power system, also referred to below as on-board power system for short, is provided and configured for an electrically driven transportation vehicle. The on-board power system has a traction battery having a first and having a second battery terminal. The traction battery (high-voltage battery, HV battery) provides a high voltage at its battery terminals. In this case, a high voltage is understood to mean a voltage having a value greater than 60 V. By way of example, the voltage provided by the traction battery is 400 V or 800 V. To this end, the positive pole of the traction battery is suitably electrically connected to the first battery terminal and the negative pole of the traction battery is suitably electrically connected to the second battery terminal.

The on-board power system furthermore comprises a first current path between the first battery terminal and a first terminal for a high-voltage component. The first terminal for the high-voltage component is also referred to here and hereinafter as first component terminal. In this case, an electrical or electromagnetic first switch is arranged in the first current path between the first battery terminal and the first component terminal. This first switch is able to be switched into the off state when driven accordingly. The first switch may be designed as a contactor.

In summary, the first battery terminal is electrically connected to the first component terminal, wherein the first switch is connected between the first battery terminal and the first component terminal.

In a manner similar thereto, the on-board power system furthermore comprises a second current path between the second battery terminal and a second terminal for the high-voltage component, which second terminal is also referred to hereinafter as second component terminal. In this case, an electrical or electromagnetic second switch is arranged between the second battery terminal and the second component terminal. This second switch is able to be switched into the off state when driven accordingly. The second switch may be designed as a contactor.

The high-voltage component is in this case a consumer, such as, for example, an electric motor, or an air-conditioning compressor, or alternatively a charging socket by way of which a charging current is able to be supplied to the traction battery for charging purposes.

The on-board power system furthermore has a DC-to-DC voltage converter. A first input of the DC-to-DC voltage converter is in this case electrically connected to a first tap in the first current path, which first tap is arranged between the first battery terminal and the first switch. A second input of the DC-to-DC voltage converter is electrically connected to a second tap in the second current path, which second tap is arranged between the second switch and the second component terminal.

The DC-to-DC voltage converter is connected at output to a low-voltage system. In other words, the low-voltage system is connected to the output terminals of the DC-to-DC voltage converter. In this case, a low voltage suitable for operating low-voltage consumers of the low-voltage system is provided at the output terminals. "Low-volt" or "low voltage" is in this case understood to mean a voltage having a value less than or equal to 60 V, for example, 24 V or 48 V, in particular, 12 V.

The high voltage provided by the traction battery is thus converted into a low voltage by way of the DC-to-DC voltage converter, such that the low-voltage consumers, in particular, a safety-relevant low-voltage consumer, of the low-voltage system are able to be, and if necessary also are, supplied with electrical energy by the traction battery by virtue of the DC-to-DC voltage converter, in particular, redundantly with respect to a battery connected into the low-voltage system.

When the first switch is switched into the off state, the first component terminal is electrically disconnected from the first battery terminal. The high-voltage component connected to the component terminals is thereby able to be deactivated, and expediently also is deactivated, in the event of a fault with this component. The traction battery in this case furthermore applies a voltage to the DC-to-DC voltage converter, such that the safety-relevant low-voltage consumers of the low-voltage system are still able to be supplied with energy by the traction battery.

An additional switching element between the first battery terminal and the first input of the DC-to-DC voltage converter for reversibly interrupting this current path is not necessary.

According to at least one disclosed embodiment of the on-board power system, the DC-to-DC voltage converter is designed as a DC-to-DC voltage converter with galvanic isolation. In other words, the inputs of the DC-to-DC voltage converter are not electrically conductively connected to the outputs of the DC-to-DC voltage converter. By way of example, a transformer is used as coupling member between inputs and outputs. Electrical isolation is thereby achieved between the input side and the output side of the DC-to-DC voltage converter and/or propagation of a fault, such as, for example, an overcurrent, an overvoltage or a voltage peak to the low-voltage system, is thereby avoided.

The DC-to-DC voltage converter may be able to be deactivated, such that discharging or deep discharging of the traction battery is avoided when there is no supply to the low-voltage consumers by the traction battery by way of the DC-to-DC voltage converter.

According to at least one disclosed embodiment of the on-board power system, a first fuse element is connected between the first tap, which is arranged in the first current path, and the first input of the DC-to-DC voltage converter. The first fuse element is designed, for example, as a fuse. The first fuse element may be designed as a pyrotechnic fuse, that is to say as a fuse in which the current path is interrupted by virtue of the ignition of a propellant or an explosive charge. In summary, such a fuse element, in the case of the pyrotechnic fuse when it is actuated accordingly, interrupts the current path between the first tap and the first input. The first input of the DC-to-DC voltage converter is thus able to be disconnected only irreversibly from the first battery terminal. If the second switch is not able to be switched into the off state, for example, due to a defect, it is made possible to interrupt the current flow through the DC-to-DC voltage converter by way of the first fuse element. The first fuse element thus performs a safety function.

According to one expedient development, a second fuse element is connected in the first current path between the first switch and the first component terminal. The second fuse element serves to electrically interrupt the first current path, in particular, if the first switch is not able to be switched into the off state, for example, due to a defect. The second fuse element is designed, for example, as a fuse or as a pyrotechnic fuse.

In a manner similar thereto, a third fuse element is connected, for example, in the second current path between the second switch and the second load terminal.

According to a method for operating an electrical on-board power system that is embodied as in one of the options set forth above, the first switch is switched into the off state in the event of a fault in the high-voltage component. The second switch initially remains in the on state in this case. In other words, a single-pole disconnection of the traction battery from the component terminals takes place. As a result, the high-voltage component is no longer operated. Such a fault case is, for example, a short circuit in the high-voltage component, a predefined temperature of the high-voltage component being exceeded, a predefined current or a predefined voltage being exceeded, or damaged insulation.

In this case, due to the connection, set forth above, of the DC-to-DC voltage converter, specifically due to the connection of its first input to the first tap arranged between the first battery terminal and the first switch and due to the connection of its second input to the second tap arranged between the second switch and the second component terminal, the high voltage provided by the traction battery is present at the DC-to-DC voltage converter even in the case of single-pole disconnection of the faulty high-voltage component. As a result, this allows a redundant energy supply for the safety-relevant low-voltage consumers by way of the traction battery, even in the case of single-pole disconnection of the traction battery from the component terminals.

When the first switch is switched into the off state, according to one expedient refinement of the method, just one or each safety-relevant low-voltage consumer of the low-voltage system is or are supplied with energy by the traction battery by way of the DC-to-DC voltage converter. Comfort consumers on the other hand are no longer supplied with energy by the traction battery. To this end, the comfort consumers are, for example, connected disconnectably in the low-voltage system or are able to be deactivated.

According to at least one disclosed embodiment of the method, in addition to switching the first switch into the off state, the second switch is switched into the off state (opened) when the transportation vehicle is stationary. In other words, the second component terminal is then also disconnected from the traction battery, that is to say the second current path is electrically interrupted.

The supply of a voltage, provided by the traction battery at the second battery terminal, to a transportation vehicle component, for example, due to faulty insulation, is thereby avoided. As a result, if a person touches this transportation vehicle component, a risk to this person stemming from this voltage is avoided.

If the fault case occurs during a journey, the first switch is initially switched into the off state. As soon as the transportation vehicle is stationary, the second switch is switched into the off state. If on the other hand the fault case occurs when the transportation vehicle is stationary, the second switch and the first switch are switched, for example, simultaneously into the off state.

According to at least one disclosed embodiment, an electrically driven transportation vehicle has an on-board power system that is designed in accordance with one of the options set forth above and is additionally or alternatively operated in accordance with the method in one of the options set forth above. The on-board power system of the electrically driven transportation vehicle thus has a DC-to-DC voltage converter that is connected at output to a low-voltage system, wherein the first input of the DC-to-DC voltage converter is connected to the first tap arranged in the first current path between the first battery terminal and the first switch, and wherein the second input of the DC-to-DC voltage converter is connected to the second tap arranged in the second current path between the second switch and the second load terminal.

Mutually corresponding parts and variables are always provided with the same reference signs in all of the figures.

FIG. 1 illustrates an electrically driven transportation vehicle 2 whose on-board power system 4 comprises a traction battery 6 having a first battery terminal 8 and a second battery terminal 10. The traction battery 6 has a number of battery cells 12 that are connected in parallel and/or in series with one another. FIG. 1 in this case illustrates only three series-connected battery cells 12 for the sake of improved clarity.

Furthermore, the positive pole of the traction battery 6 is electrically connected to the first battery terminal 8 and the negative pole of the traction battery 6 is electrically connected to the second battery terminal 10. A high voltage is thereby provided at the battery terminals 8, 10.

The on-board power system 4 furthermore has a first current path 14 between the first battery terminal 8 and a first component terminal 16, and a second current path 18 between the second battery terminal 10 and a second component terminal 20. An electric motor 22 for driving the transportation vehicle 2 via an inverter 24 and a high-voltage auxiliary consumer 26, which is designed here as an air-conditioning compressor, are in this case connected to the component terminals 16 and 20. A charging socket 27 is furthermore connected to the component terminals 16 and 20, such that the traction battery 6 is able to be charged.

In summary, the components 22, 24, 26, 27 connected to the component terminals 16 and 20 are referred to as high-voltage components.

A first switch 28, designed as a contactor, is connected in the first current path 14 between the first battery terminal 8 and the first component terminal 16. In a manner similar thereto, a second switch 30, designed as a contactor, is connected in the second current path 18 between the second battery terminal 10 and the second component terminal 20. The switches 28 and 30 are each able to be switched into the off state when driven accordingly, such that the component terminals 16, 20 are able to be electrically disconnected from the first battery terminal 8 or from the second battery terminal 10.

The on-board power system 4 furthermore has a DC-to-DC voltage converter 32 whose first input 34 is electrically connected to a first tap 36, which first tap 36 is arranged in the first current path 14 between the first battery terminal 8 and the first switch 28. A second input 38 of the DC-to-DC voltage converter 32 is electrically connected to a second tap 40, which second tap 40 is arranged in the second current path 18 between the second switch 30 and the second component terminal 20.

The first battery terminal 8, the first input 34, the second input 38, the second switch 30 and the second battery terminal 10 are thereby connected in series.

In summary, in the first current path 14, the first tap 36 is arranged upstream of the first switch 28, going from the first battery terminal 8 to the first component terminal 16. In the second current path 18, the second tap 40 is arranged downstream of the second switch 30, going from the second battery terminal 8 to the second component terminal 20.

The DC-to-DC voltage converter 32 is connected at output, at its first output 42 and at its second output 44, to a low-voltage system 46. The low-voltage system 46 in this case has a safety-relevant (low-voltage) consumer 48 that is intended to be, and also is, supplied redundantly with energy by the traction battery 6 by way of the DC-to-DC voltage converter 32.

To this end, the (high) voltage provided by the traction battery 6 is converted into a (low) voltage suitable for operating the safety-relevant consumer 48 by way of the DC-to-DC voltage converter 32, and accordingly provided at the outputs 42, 44.

The DC-to-DC voltage converter 32 is designed as a DC-to-DC voltage converter with galvanic isolation, such that electrical isolation is achieved between the input side and the output side of the DC-to-DC voltage converter 32.

The on-board power system 4 has a first fuse element 50 that is connected between the first tap 36 and the first input 34 of the DC-to-DC voltage converter 32. The on-board power system additionally has a second fuse element 52 that is connected in the first current path 14 between the first switch 28 and the first component terminal 16.

The first fuse element 50 and the second fuse element 52 are in this case each designed as a pyrotechnic fuse and serve as a redundant fuse, in particular, against an overcurrent or a short circuit.

In summary, the first input 34 of the DC-to-DC voltage converter 32 is thus able to be disconnected only irreversibly from the first battery terminal 8.

Figure 2:
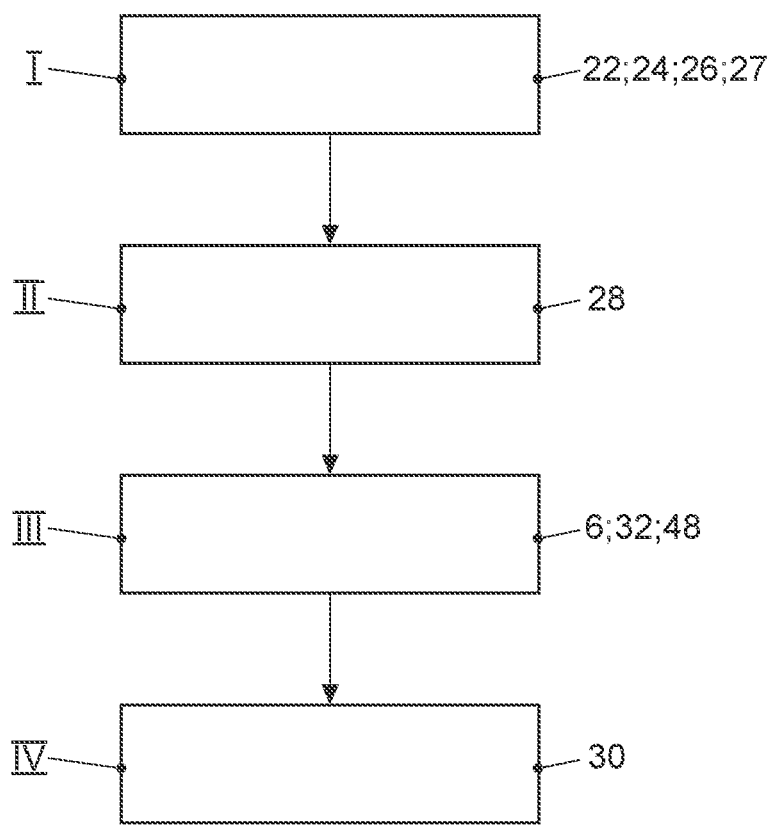
FIG. 2 shows a flowchart of a method sequence for operating the on-board power system.

The flowchart illustrated in FIG. 2 represents a method sequence for operating the on-board power system 4 according to FIG. 1.

In a first operation at I, a fault case with one of the high-voltage components is initially detected. Such a fault case is, for example, a short circuit in the high-voltage component, a predefined temperature of the high-voltage component being exceeded, a predefined current or a predefined voltage being exceeded, or damaged insulation. To detect the fault case, the high-voltage components have appropriate sensors, which are not illustrated in more detail in FIG. 1.

In a second operation at II, the first switch 28 is switched into the off state, wherein the second switch 30 initially remains in the on state. The first component terminal 16 is thereby disconnected from the voltage, such that the high-voltage components connected to the component terminals 16, 20 are no longer operated. In this case, the high voltage provided by the traction battery 6 is still present at the DC-to-DC voltage converter 32, such that the safety-relevant low-voltage consumer 48 is still supplied redundantly with energy by the traction battery 6.

A comfort consumer 54, which is connected to the low-voltage system 46 by virtue of the switches 56 and 58, is in this case no longer supplied with energy as a result of the switches 56 and/or 58 being switched into the off state. There is thus only a redundant energy supply for the safety-relevant low-voltage consumers 48 when the first switch 28 is switched into the off state (operation at III).

As soon as the transportation vehicle 2 is stationary, the second switch 30 is switched into the off state in a fourth operation at IV, such that both component terminals 16 and 20 are disconnected from the voltage.

The switches 28, 30, 56 and 58 are in this case driven by a controller, not illustrated in more detail, in accordance with the method set forth above.

The disclosure is not restricted to the exemplary embodiment described above. On the contrary, other variations may be derived therefrom by a person skilled in the art without departing from the subject matter of the disclosure. All of the individual features described in connection with the exemplary embodiment may also be combined with one another in other ways without departing from the subject matter of the disclosure.

LIST OF REFERENCE SIGNS 2 electrically driven transportation vehicle
4 electrical on-board power system
6 traction battery
8 first battery terminal
10 second battery terminal
12 battery cell
14 first current path
16 first component terminal
18 second current path
20 second component terminal
22 electric motor
24 inverter
26 high-voltage auxiliary consumer
27 charging socket
28 first switch
30 second switch
32 DC-to-DC voltage converter
34 first input
36 first tap
38 second input
40 second tap
42 first output
44 second output
46 low-voltage system
48 safety-relevant (low-voltage) consumer
50 first fuse element
52 second fuse element
54 comfort consumer
56 switch
58 switch
I Detect a fault case with a high-voltage component
II Switch the first switch into the off state
III Supply energy to the safety-relevant consumer
IV Switch the second switch into the off state

The invention claimed is:

1. An electrical on-board power system for an electrically driven transportation vehicle, the electrical on-board power system comprising:
a traction battery having first and second battery terminals providing a high voltage;
a first current path coupling the first battery terminal to a first component terminal for a high-voltage component; and
a second current path coupling the second battery terminal to a second component terminal for the high-voltage component,
an electrical or electromagnetic first switch within the first current path;
an electrical or electromagnetic second switch within the second current path;
a DC-to-DC voltage converter connected at output to a low-voltage system,
wherein a first input of the DC-to-DC voltage converter is connected to a first tap located in the first current path between the first battery terminal and the first switch, and
wherein a second input of the DC-to-DC voltage converter is connected to a second tap located in the second current path between the second switch and the second component terminal,
a first fuse element connected between the first tap on the first current path and the first input of the DC-to-DC voltage converter; and
a second fuse element is connected between the first switch and the first component terminal in the first current path,
wherein the first switch is switched to block current in response to a detected fault in the high-voltage component.

2. The electrical on-board power system of claim 1, wherein the DC-to-DC voltage converter is a DC-to-DC voltage converter with galvanic isolation.

3. An electrically-driven transportation vehicle having the electrical on-board power system of claim 1.

4. A method for operating the electrical on-board power system for an electrically driven transportation vehicle, the method comprising:
providing a traction battery having first and second battery terminals providing a high voltage, a first current path coupling the first battery terminal to a first component terminal for a high-voltage component, and a second current path coupling the second battery terminal to a second component terminal for the high-voltage component,
wherein an electrical or electromagnetic first switch is provided within the first current path and an electrical or electromagnetic second switch is provided within the second current path,
providing a DC-to-DC voltage converter connected at output to a low-voltage system,
wherein a first input of the DC-to-DC voltage converter is connected to a first tap located in the first current path between the first battery terminal and the first switch, and wherein a second input of the DC-to-DC voltage converter is connected to a second tap located in the second current path between the second switch and the second component terminal, and
wherein a first fuse element connected between the first tap on the first current path and the first input of the DC-to-DC voltage converter,
wherein a second fuse element is connected between the first switch and the first component terminal in the first current path,
detecting a fault occurring in the high-voltage component, and
switching the first switch into the off state in response to the detected fault.

5. The method of claim 4, wherein, in response to the first switch being switched into the off state, only a safety-relevant low-voltage consumer of the low-voltage system is supplied with energy by the traction battery by way of the DC-to-DC voltage converter.

6. The method of claim 4, further comprising opening the second switch as soon as the transportation vehicle is stationary.

7. An electrical on-board power system for an electrically driven transportation vehicle, the electrical on-board power system comprising:
   a traction battery having first and second battery terminals providing a high voltage;
   a first current path coupling the first battery terminal to a first component terminal for a high-voltage component; and
   a second current path coupling the second battery terminal to a second component terminal for the high-voltage component,
   an electrical or electromagnetic first switch within the first current path;
   an electrical or electromagnetic second switch within the second current path; and
   a DC-to-DC voltage converter connected at output to a low-voltage system,
   wherein a first input of the DC-to-DC voltage converter is connected to a first tap located in the first current path between the first battery terminal and the first switch,
   wherein a second input of the DC-to-DC voltage converter is connected to a second tap located in the second current path between the second switch and the second component terminal, and
   wherein, in response to the first switch being switched into an off state, only a safety-relevant low-voltage consumer of the low-voltage system is supplied with energy by the traction battery by way of the DC-to-DC voltage converter.

8. The electrical on-board power system of claim 7, wherein the DC-to-DC voltage converter is a DC-to-DC voltage converter with galvanic isolation.

9. An electrically-driven transportation vehicle having the electrical on-board power system of claim 7.

10. A method for operating the electrical on-board power system for an electrically driven transportation vehicle, the method comprising:
    providing a traction battery having first and second battery terminals providing a high voltage, a first current path coupling the first battery terminal to a first component terminal for a high-voltage component, and a second current path coupling the second battery terminal to a second component terminal for the high-voltage component,
      wherein an electrical or electromagnetic first switch is provided within the first current path and an electrical or electromagnetic second switch is provided within the second current path,
    providing a DC-to-DC voltage converter connected at output to a low-voltage system,
      wherein a first input of the DC-to-DC voltage converter is connected to a first tap located in the first current path between the first battery terminal and the first switch, and wherein a second input of the DC-to-DC voltage converter is connected to a second tap located in the second current path between the second switch and the second component terminal,
    detecting a fault occurring in the high-voltage component, and
    switching the first switch into the off state in response to the detected fault, whereby only a safety-relevant low-voltage consumer of the low-voltage system is supplied with energy by the traction battery by way of the DC-to-DC voltage converter.

11. The method of claim 10, further comprising opening the second switch as soon as the transportation vehicle is stationary.

* * * * *